US011882266B2

(12) United States Patent
Hwang et al.

(10) Patent No.: US 11,882,266 B2
(45) Date of Patent: Jan. 23, 2024

(54) METHOD AND DEVICE TO CALIBRATE PARALLAX OPTICAL ELEMENT TO CHANGE OF LOOK DOWN ANGLE

(71) Applicant: SAMSUNG ELECTRONICS CO., LTD., Suwon-si (KR)

(72) Inventors: Chansol Hwang, Suwon-si (KR); Byong Min Kang, Yongin-si (KR); Jinho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/699,966

(22) Filed: Mar. 21, 2022

(65) Prior Publication Data
US 2023/0104842 A1 Apr. 6, 2023

(30) Foreign Application Priority Data
Sep. 30, 2021 (KR) .......................... 10-2021-0129683

(51) Int. Cl.
| | |
|---|---|
| *H04N 13/327* | (2018.01) |
| *H04N 13/383* | (2018.01) |
| *H04N 13/31* | (2018.01) |
| *G02B 30/32* | (2020.01) |
| *G02B 30/29* | (2020.01) |
| *G02B 27/01* | (2006.01) |
| *G06F 3/0488* | (2022.01) |

(52) U.S. Cl.
CPC ....... *H04N 13/327* (2018.05); *G02B 27/0101* (2013.01); *G02B 30/29* (2020.01); *G02B 30/32* (2020.01); *G06F 3/0488* (2013.01); *H04N 13/31* (2018.05); *H04N 13/383* (2018.05); *G02B 2027/0134* (2013.01)

(58) Field of Classification Search
CPC .... H04N 13/327; H04N 13/383; H04N 13/31; H04N 13/30; G02B 30/32; G02B 30/29; G02B 27/0101; G02B 2027/0134; G06F 3/0488
USPC .......................................................... 348/54
See application file for complete search history.

(56) References Cited

U.S. PATENT DOCUMENTS 8,854,433 B1 * 10/2014 Rafii ..................... G06F 3/011
                                                                 348/42
10,365,484 B2    7/2019 Ogiwara et al.
(Continued)

FOREIGN PATENT DOCUMENTS

| DE | 102013208971 A1 | 11/2014 |
|---|---|---|
| EP | 3477945 A1 | 5/2019 |

(Continued)

OTHER PUBLICATIONS

Communication dated Nov. 4, 2022, issued by the European Patent Office in European Application No. 22172050.1.

*Primary Examiner* — Behrooz M Senfi
(74) *Attorney, Agent, or Firm* — Sughrue Mion, PLLC

(57) ABSTRACT

An electronic device includes a display device configured to output an image, a parallax optical element configured to provide a light corresponding to the image output from the display device, to an eyebox of a user, and a processor configured to adjust a parameter of the parallax optical element based on a change of a look down angle (LDA) between the eyebox and a virtual image plane formed by the display device and the parallax optical element.

21 Claims, 13 Drawing Sheets

(56) References Cited

U.S. PATENT DOCUMENTS

| | | | |
|---|---|---|---|
| 10,721,462 B2 | 7/2020 | Park et al. | |
| 2014/0184551 A1* | 7/2014 | Igarashi | G06F 3/044 345/173 |
| 2017/0293297 A1* | 10/2017 | Kim | G08C 17/02 |
| 2019/0132581 A1 | 5/2019 | Park et al. | |
| 2019/0392740 A1* | 12/2019 | Funabiki | G09G 5/10 |
| 2019/0394451 A1 | 12/2019 | Shin | |
| 2020/0174267 A1* | 6/2020 | Jung | G02B 30/31 |
| 2022/0317463 A1* | 10/2022 | Urey | G02B 27/0018 |

FOREIGN PATENT DOCUMENTS

| | | | | |
|---|---|---|---|---|
| EP | 3840373 A1 | | 6/2021 | |
| JP | 2014225017 A | * | 12/2014 | G02B 27/0149 |
| JP | 6527605 B2 | | 6/2019 | |
| KR | 10-2017-0133747 A | | 12/2017 | |
| KR | 10-2019-0047453 A | | 5/2019 | |
| WO | 2021/096447 A1 | | 5/2021 | |

* cited by examiner

METHOD AND DEVICE TO CALIBRATE PARALLAX OPTICAL ELEMENT TO CHANGE OF LOOK DOWN ANGLE

CROSS-REFERENCE TO RELATED APPLICATIONS

This application claims priority to Korean Patent Application No. 10-2021-0129683, filed on Sep. 30, 2021, in the Korean Intellectual Property Office, the disclosure of which is incorporated by reference herein in its entirety.

BACKGROUND

1. Field

Example embodiments of the present disclosure relate to a method and device to calibrate a parallax optical element with respect to a change of a look down angle.

2. Description of Related Art

A most dominant factor among factors for recognizing a stereoscopic image is a difference between images seen by both eyes of a user. A scheme of presenting different images to both eyes of a user may include a stereoscopic scheme of filtering images using, for example, polarization-based division, time division, or wavelength division of varying a wavelength of a primary color, and an autostereoscopic scheme of presenting each image to be viewed from a predetermined viewpoint using a three-dimensional (3D) conversion device, such as, for example, a parallax barrier, a lenticular lens, or a directional backlight unit.

The autostereoscopic scheme has an advantage of reducing an inconvenience of wearing glasses. To suppress crosstalk of a 3D image in the autostereoscopic scheme, it is necessary to accurately irradiate the 3D image to both eyes of the user. When an error different from a designed value is generated in a process of manufacturing or installing the 3D display device and the 3D conversion device, an image quality may be deteriorated.

SUMMARY

One or more example embodiments provide a method and device to calibrate a parallax optical element with respect to a change of a look down angle.

According to an aspect of an example embodiment, there is provided an electronic device including a display device configured to output an image, a parallax optical element configured to provide a light corresponding to the image output from the display device, to an eyebox of a user, and a processor configured to adjust a parameter of the parallax optical element based on a change of a look down angle (LDA) between the eyebox and a virtual image plane formed by the display device and the parallax optical element.

The processor may be further configured to adjust a position offset parameter among parameters of the parallax optical element based on the change of the LDA.

Based on the LDA changing, the processor may be further configured to perform calibration of a position offset parameter through a calibration pattern based on the changed LDA, and obtain a value of a position offset parameter that aligns the calibration pattern at the changed LDA.

Based on a position offset parameter value being recorded according to calibration previously performed at the changed LDA, the processor may be further configured to load the position offset parameter value previously recorded corresponding to the changed LDA.

The processor may be further configured to skip provision of a calibration pattern based on the processor being accessible to an LDA model representing a linear relationship between an LDA and a position offset parameter, and obtain a position offset parameter for an LDA converted based on the LDA model.

The processor may be further configured to build the LDA model by individually performing calibration of a position offset parameter of a plurality of LDAs that are different from each other.

The processor may be further configured to compensate a previously built LDA model based on a difference between the previously built LDA model and a result of calibration of the position offset parameter through a calibration pattern for an LDA by the user.

The electronic device may further include an input receiver configured to receive an input for calibration for the parallax optical element from the user observing a pattern image in the eyebox, wherein the processor may be further configured to adjust a position offset parameter of the parallax optical element based on the input, render a calibration pattern again based on an adjusted parameter, and output a changed pattern image through the display device.

The processor may be further configured to move a pattern corresponding to a pattern image in one direction from a direction of the user's observation based on a position offset parameter among parameters of the parallax optical element increasing according to an input received by the input receiver, and move a pattern corresponding to a pattern image in another direction, which is opposite to the one direction, from the direction of the user's observation based on a position offset parameter among parameters of the parallax optical element decreasing according to an input received by the input receiver.

The processor may be configured to increase the position offset parameter to move a calibration pattern corresponding to a pattern image in a direction corresponding to the one direction based on a straight-line manipulation of one direction being detected in the input receiver while the pattern image corresponding to a position offset parameter is provided, and decrease the position offset parameter to move a calibration pattern corresponding to a pattern image in a direction corresponding to the other direction based on a straight-line manipulation of another direction opposite to the one direction being detected in the input receiver while the pattern image corresponding to a position offset parameter is provided.

The input receiver may include a touchscreen, and wherein the processor may be further configured to output a graphic representation guiding a straight-line manipulation on the touchscreen during the calibration for the position offset parameter, and adjust the position offset parameter based on a linear movement of a touch point from one point to another point on the touchscreen being detected based on the graphic representation.

The processor may be further configured to perform calibration of the position offset parameter of the parallax optical element by automatically repeating an adjustment of the position offset parameter until a reference line of a calibration pattern included in an image captured by a camera installed in the eyebox is aligned.

The processor may be further configured to track a change of the LDA based on an eye height of the user.

The processor may be further configured to track a change of the LDA based on driving of a motor rotating a magnifying mirror that magnifies an image ray output from a display panel in the display device.

The processor may be further configured to maintain values of a pitch parameter and a slanted angle parameter based on a change of the LDA.

The processor may be further configured to precede and complete calibration of a pitch parameter and a slanted angle parameter among parameters of the parallax optical element, and initiate the calibration of the position offset parameter based on the change of the LDA while the pitch parameter and the slanted angle parameter remain constant.

The processor may be further configured to store parameters personalized to the user of the parallax optical element based on the calibration of the parameter of the parallax optical element being completed on the user, render a content image based on the personalized parameters, and output the content image to the display device.

The display device may be implemented as at least a portion of a head-up display (HUD) mounted on a vehicle including a motorcycle, a car, a train, a watercraft, an aircraft, and a spacecraft.

According to another aspect of an example embodiment, there is provided a method including providing, by a parallax optical element, a light corresponding to an image output from a display device, to an eyebox of a user, and adjusting a parameter of the parallax optical element based on a change of a look down angle (LDA) between the eyebox and a virtual image plane formed by the display device and the parallax optical element.

According to yet another aspect of an example embodiment, there is provided an a non-transitory computer-readable recording medium including one or more computer programs including instructions to execute a method, the method including providing, by a parallax optical element, a light corresponding to an image output from a display device to an eyebox of a user, and adjusting a parameter of the parallax optical element based on a change of a look down angle (LDA) between the eyebox and a virtual image plane formed by the display device and the parallax optical element.

According to yet another aspect of an example embodiment, there is provided an electronic device including a display device, a parallax optical element configured to provide a light corresponding to an image output from the display device to an eyebox of a user, and a processor configured to adjust an offset parameter among parameters of the parallax optical element based on a change of a look down angle (LDA) between the eyebox and a virtual image plane formed by the display device and the parallax optical element.

BRIEF DESCRIPTION OF THE DRAWINGS

The above and/or other aspects, features, and advantages of example embodiments will be more apparent from the following description taken in conjunction with the accompanying drawings, in which.

DETAILED DESCRIPTION

Figure 1:
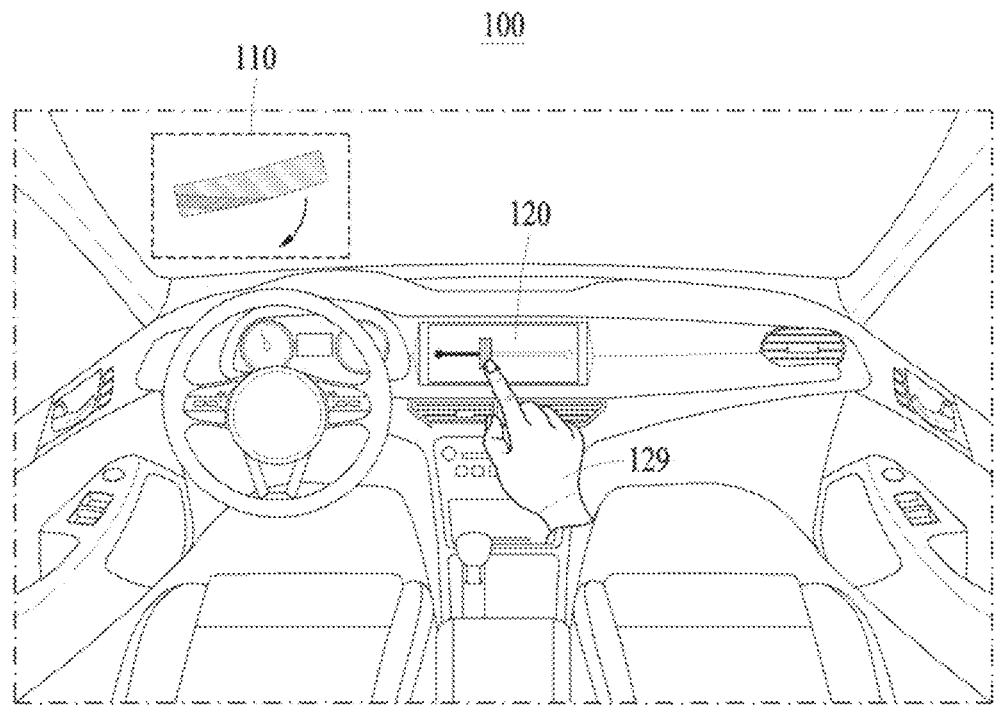
FIG. 1 illustrates an electronic device performing calibration of a parallax optical element according to an example embodiment.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms "a", "an", and "the" are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined, all terms including technical or scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, examples will be described in detail with reference to the accompanying drawings. Regarding the reference numerals assigned to the elements in the drawings, it should be noted that the same elements will be designated by the same reference numerals, and redundant descriptions thereof will be omitted.

FIG. 1 illustrates an electronic device performing calibration of a parallax optical element according to an example embodiment.

An electronic device 100 may provide a stereoscopic image to a user. For example, the electronic device 100 may provide an image having a binocular disparity to both eyes of the user. The image having the binocular disparity may include a first image provided to a left eye of the user and a second image provided to a right eye of the user. Pixels corresponding to the same object and/or the same point in the first image and the second image may be spaced apart by a disparity according to a depth (e.g., a distance from the corresponding object defined and/or set to be recognized by the user) of the corresponding object and/or the corresponding point. For ease and convenience, a description is given of an example in which an image is provided to a first viewpoint corresponding to a left eye of a user and a second viewpoint corresponding to a right eye of the user as a provision of a stereoscopic image to both eyes of a user, but embodiments are not limited thereto. Hereinafter, the terms "viewpoint" may be interchangeably used with the term "view." Depending on designs, an image may be provided to at least two viewpoints, and a stereoscopic image may be provided to at least two users. For example, the electronic device 100 may provide an image pair having a binocular disparity for each pixel to a first viewpoint corresponding to a left eye of a first user and a second viewpoint corresponding to a right eye of the first user. In addition, the electronic device 100 may also provide an image pair having a binocular disparity for each pixel to a third viewpoint corresponding to a left eye of a second user and a fourth viewpoint corresponding to a right eye of the second user.

For reference, in the present disclosure, an eyebox corresponding to one viewpoint may be an area in which an image pair corresponding to the viewpoint is provided. For example, the eyebox may be determined based on a height of a user's gaze. When the user gazes at the front in the eyebox, the aforementioned image pair may be viewable by the user.

The electronic device 100 may output an image through a display panel, and a parallax optical element of the electronic device 100 may direct a light corresponding to the output image to a plurality of viewpoints. Due to an error and/or tolerance in a manufacturing process, the user may view, through one of a left eye or a right eye, a portion of an image that should have been provided to the other one of the left eye or the right eye without fine-tuning through calibration. As described above, providing an image that is to be observed at another viewpoint may be referred to as crosstalk. To allow the user to recognize an accurate sense of depth and view a clear image, only a left-eye image may be observed at a viewpoint corresponding to the left eye of the user and only a right-eye image may be observed at a viewpoint corresponding to the right eye.

The electronic device 100 may perform calibration to reduce and/or remove the crosstalk. The electronic device 100 may provide, to the user, a calibration pattern 110 corresponding to a pattern image for calibration. The electronic device 100 may receive an input 129 for calibration from the user observing the calibration pattern 110 corresponding to the pattern image. In response to the input 129 for calibration being received, the electronic device 100 may adjust a parameter of the parallax optical element based on the corresponding input 129. The electronic device 100 may change the calibration pattern 110 corresponding to the pattern image according to the adjusted parameter. The user may repetitively input a manipulation for the calibration until the calibration pattern corresponding to the calibration pattern 110 corresponding to the pattern image is aligned to a reference line (e.g., a vertical line and/or a horizontal line). The electronic device 100 may include an input interface 120 configured to be manipulated by a user for calibration. For example, in FIG. 1, a parameter of the parallax optical element may be adjusted in response to a touchscreen of the electronic device 100 outputting a slider bar and the electronic device 100 detecting an input 129 (e.g., an input of horizontally moving a slider bar object) on the slider bar. However, a parameter adjustment of the parallax optical element for changing the calibration pattern 110 is not limited to depending on a manual input of the user. For example, the electronic device 100 may observe the calibration pattern 110 in an eyebox through a separate camera module (camera) facing the same direction as the user and adjust the parameter of the aforementioned parallax optical element based on a result of the observing.

For example, as illustrated in FIG. 1, the electronic device 100 mounted on a vehicle may project a content image and/or a pattern image through a windshield glass of the vehicle, thereby providing the corresponding image to the user. A head-up display (HUD) using the windshield glass will be described with reference to FIG. 2.

Figure 2:
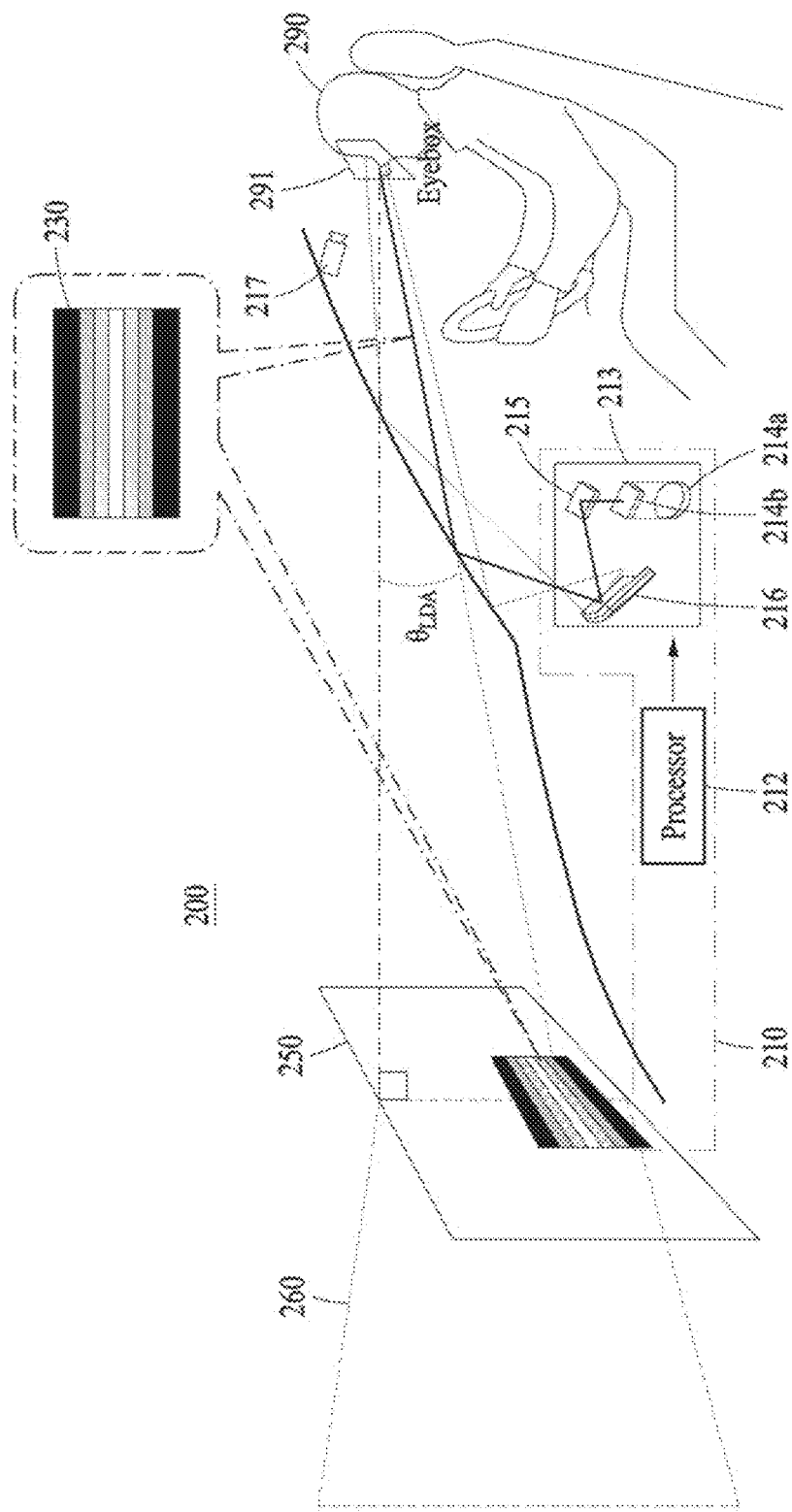
FIG. 2 illustrates an example of an electronic device including a head-up display (HUD) according to an example embodiment.

FIG. 2 illustrates an example of an electronic device including an HUD according to an example embodiment.

A calibration system 200 is a system for providing calibration of a parallax optical element to a user 290 and may be, for example, a device including an electronic device 210 (e.g., the electronic device 100 of FIG. 1).

The electronic device 210 may include a processor 212 and an HUD 213. In addition, the electronic device 210 may also include an eye detector 217.

The processor 212 may output a rendered pattern image through the HUD 213, thereby providing a pattern image to the user 290. The processor 212 may re-render and provide a pattern image according to a parameter adjusted based on an observation result in a separate camera module disposed in an eyebox 291 and/or an input of a user during the calibration. After the calibration is completed, the processor 212 may render a content image using a fixed parameter and provide the rendered content image to a user. The content image may be information including contents related to, for example, an operation. In a case of a vehicle, information associated with an operation (hereinafter, referred to as "operating information") may include, for example, route guidance information and driving related information.

The HUD 213 may visualize a stereoscopic image in a visible region of the user 290 located in front of the user 290. For example, the HUD 213 may visualize a pattern image on a glass (e.g., a windshield glass of the vehicle) disposed in front of the user 290. The HUD 213 may form a virtual projection plane. Hereinafter, the virtual projection plane may also be referred to as a virtual image plane 250. The virtual image plane 250 may be a plane on which a virtual image including a pattern generated by the HUD 213 is displayed. The user 290 may recognize the virtual image as if the virtual image is located on the virtual image plane 250. For example, due to an optical system by the windshield glass of the vehicle and the HUD 213, the user may view an observed image 230 with a calibration pattern (e.g., an observed pattern) in a different form from an intended calibration pattern. For example, the user 290 may view the observed image 230 in an eyebox 291. The observed image 230 may be, for example, in a form in which the calibration pattern is more blurred than intended or a gradation is added.

In addition, the HUD 213 may visualize a content image having a depth on the virtual image plane 250. For example, the processor 212 may provide a content image including a left image and a right image having a binocular disparity corresponding to a depth at which an object can be visualized, to the user 290 through the HUD 213. The HUD 213 may visualize contents having a depth corresponding to a region within a virtual region 260 on the virtual image plane 250. Here, the processor 212 may render contents into three-dimensional (3D) graphic representation based on the optical system of the HUD 213. The 3D graphic representation may be a stereoscopic graphic representation having a depth. The HUD 213 may form a content image including a left image and a right image on the virtual image plane 250 based on the depth of the contents, and provide the left image to a left eye of the user 290 and the right image to a right eye of the user 290 through the virtual image plane 250. In other words, although one virtual image may be formed on the virtual image plane 250, a light corresponding to the left image and a light corresponding to the right image are separated from the one virtual image by the optical system according to the windshield glass and the HUD 213, so that the lights are directed to the left eye and the right eye of the user 290, respectively. As described above, the eyebox 291 is a region to which the light corresponding to the left image and the light corresponding to the right image reach, and may include regions corresponding to the left eye and the right eye of the user 290. Accordingly, the light corresponding to the left image and the light corresponding to the right image representing contents in the eyebox 291 may individually reach both eyes of the user so that the user 290 recognizes a sense of depth of three-dimensionally rendered contents.

The HUD 213 may include, for example, a picture generation unit, a fold mirror 215, and a magnifying mirror 216 (e.g., a concave mirror). The picture generation unit may include a display module and a parallax optical element. The parallax optical element may include, for example, a lenticular lens and a parallax barrier. The display module may include a light source 214a and a display (e.g., a display panel 214b). In an image ray that is light emitted from the light source 214a and passes through the display panel 214b, an image ray passing through a portion corresponding to the left image of the display panel 214b may be directed to the left eye of the user by the parallax optical element, and an image ray passing through a portion corresponding to the right image may be directed to the right eye of the user by the parallax optical element. However, a configuration of the HUD 213 is not limited thereto. For example, the HUD 213 may include various elements that form the virtual image plane 250 on which a virtual image is formed through a projection onto a glass located in front of the user 290.

In the present disclosure, the electronic device 210 is mounted on a vehicle as an example, but embodiments are not limited thereto. For example, the electronic device 210 may be applied to technologies for combining real information and virtual information, such as an augmented reality (AR) glass and a mixed reality (MR), and may also be applied to a vehicle such as a motorcycle, an aircraft, and a train in addition to a car.

The electronic device 210 may adjust a depth of contents, thereby expressing consecutive depths without changing a position of the virtual image plane 250 formed by the HUD 213. In addition, since the position of the virtual image plane 250 is not to be changed, the electronic device 210 may not require a physical manipulation of elements included in the HUD 213.

A look down angle (LDA) $\theta LDA$ is an angle at which a user looks down, and may be an angle between the eyebox 291 and the virtual image plane 250 formed by the display module and the parallax optical element. For example, the LDA $\theta LDA$ may be an angle between the virtual image plane 250 and a plane on which the eyebox 291 is located.

The electronic device 210 may change the LDA $\theta LDA$. For example, the electronic device 210 may provide the LDA $\theta LDA$ corresponding to an individual user's gaze height (e.g., a height determined based on a sitting height of the user) and a height preferred by the user.

The processor 212 of the electronic device 210 may track a change of the LDA $\theta LDA$ based on an eye height of the user 290. The electronic device 210 may detect a position of an eye of the user 290 through the eye detector 217 and move the eyebox 291 to the detected position of the eye, thereby changing the LDA $\theta LDA$. As an example, the electronic device 210 may track the changed LDA $\theta LDA$ by calculating a changed angle between the eyebox 291 and the virtual image plane 250 according to the movement of the eyebox 291. As another example, in the HUD 213, the electronic device 210 may rotate the magnifying mirror 216 based on an axis parallel to an axis (e.g., a lateral axis of the vehicle) parallel to the ground, thereby changing a height perpendicular to the ground of the eyebox 291. The processor 212 of the electronic device 210 may track a change of the LDA $\theta LDA$ based on driving of a motor that rotates the magnifying mirror 216 magnifying an image ray output from the display panel 214b in the display module. The electronic device 210 may determine the LDA $\theta LDA$ corresponding to an angle at which the magnifying mirror 216 is rotated in accordance with the driving of the motor.

In addition, although an example of determining the LDA $\theta LDA$ based on the gaze tracking is described, the embodiments are not limited thereto. The electronic device 210 may adjust the position of the eyebox 291 by driving the motor in response to a manual input of the user 290. Even in this case, the electronic device 210 may determine the LDA $\theta LDA$ corresponding to the angle of the rotated magnifying mirror 216 according to the driving of the motor. For example, in the present disclosure, a description is given of an example in which the virtual image plane 250 is fixed and the position of the eyebox 291 is changed, however, embodiments are not limited thereto. When a position of the virtual image plane 250 is changed according to the changed position of the eyebox 291, the electronic device 210 may track a relative angle change between the eyebox 291 and the virtual image plane 250.

A deviation in binocular separation through the parallax optical element may occur due to the change of the LDA θLDA as described above. An adjustment of a parameter of the parallax optical element performed in response to the change of the LDA θLDA is described below.

Figure 3:
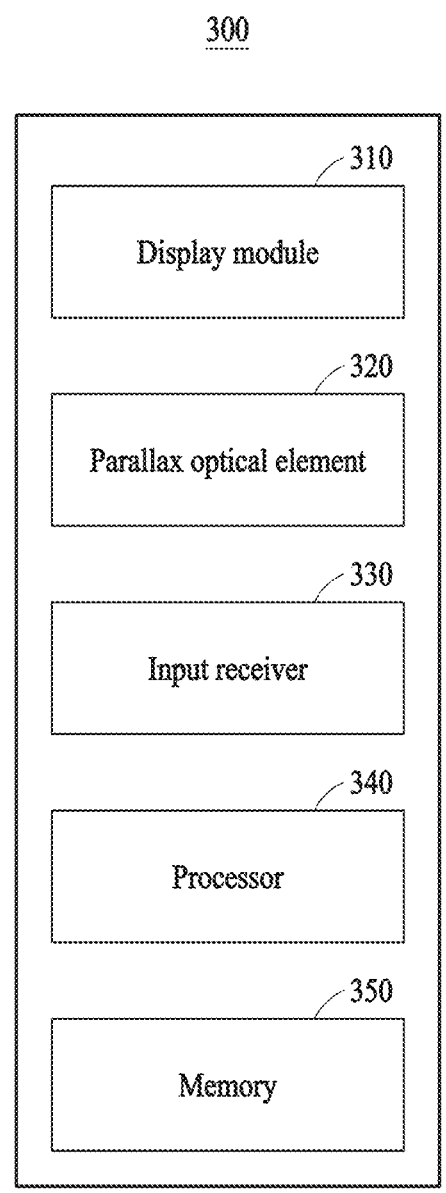
FIG. 3 is a block diagram illustrating an example of an electronic device according to an example embodiment.

FIG. 3 is a block diagram illustrating an example of an electronic device according to an example embodiment.

An electronic device 300 may include a display module 310 (a display device), a parallax optical element 320, an input receiver 330, a processor 340, and a memory 350. In addition, the electronic device 300 may also include an eye detector (e.g., the eye detector 217 of FIG. 2) and a separate camera module.

The display module 310 may visualize and output a pattern image and/or a content image. For example, the display module 310 may output an image rendered by the processor 340 of the electronic device 300. The processor 340 may generate a pattern image by rendering a calibration pattern using parameters of the parallax optical element 320 and generate a content image by rendering contents. The display module 310 may output the rendered pattern image and/or the rendered content image. The pattern image and the content image may each be an image in which images (e.g., a left image and a right image) corresponding to a plurality of viewpoints are mixed. The display module 310 may generate a light corresponding to the output image through a light source (e.g., a backlight unit) and/or self-emission, and transmit the generated light to the parallax optical element 320. For example, the display module 310 may be implemented as at least a portion of an HUD mounted on a vehicle including a motorcycle, a car, a train, a watercraft, an aircraft, and a spacecraft.

The parallax optical element 320 may provide a light corresponding to the image output from the display module 310, to an eyebox of a user. The parallax optical element 320 may be disposed at one side (e.g., front side or rear side) of the display module 310, and may be an optical element configured to direct light corresponding to the image output from the display module 310 to a plurality of viewpoints. In the present disclosure, an eyebox of one viewpoint among the plurality of viewpoints will be described as an example. For example, the parallax optical element 320 may direct a light passing through a portion corresponding to a left image of the image output by the display module 310 to an optical path to the left eye of the user in the eyebox. Likewise, the parallax optical element 320 may direct a light passing through a portion corresponding to a right image of the image output by the display module 310 to an optical path to the right eye of the user in the eyebox. The parallax optical element 320 may include optical layers such as a lenticular lens array, a parallax barrier, and a directional backlight unit.

For example, the picture generation unit of FIG. 2 may include the display module 310 and the parallax optical element 320. Although the description of FIG. 2 is given of the HUD 213 as an example for providing a stereoscopic image through the windshield glass in the vehicle, embodiments are not limited thereto. The mirrors 215 and 216 of the HUD 213 may magnify the light corresponding to the images generated by the display module 310 and the parallax optical element 320 and provide the magnified light to the user, and an optical system for magnifying the image may vary based on an application. For example, depending on a design of the HUD, a mirror may be omitted, and the mirrors may not be required in a flat panel display (e.g., a television (TV)). For brevity, in the descriptions of FIGS. 3 through 13, a description of an optical system (e.g., a fold mirror and a concave mirror) for magnifying the image will be omitted. Instead, an optical path directed to an eye (e.g., a left eye) of a user by the display panel and the parallax optical element 320 (e.g., a lenticular lens disposed at the front side or a directional backlight unit disposed at the rear side) disposed at the front side or rear side thereof will be mainly described. For example, the lenticular lens may be laminated on one side of the display panel. However, this is merely an example, and optical elements (e.g., mirrors) may be additionally included to form a virtual image plane based on an application as necessary.

For example, in the description of FIG. 2, an example of rotating the magnifying mirror by motor driving has been described. However, the example is not to be taken as being limited thereto, and at least one optical element among the plurality of optical elements forming the optical path may be configured to be rotatable by a motor. The optical path may be changed by the rotation and/or movement of at least one optical element according to the motor driving, and a position of the eyebox (e.g., the eyebox 291 of FIG. 2) may be changed based on the change of the optical path.

Through the combination of the display module 310 and the parallax optical element 320, the electronic device 300 may provide the left image to the left eye of the user and provide the right image to the right eye. The electronic device 300 may separate a graphic object obtained by visualizing contents in the left image and a graphic object obtained by visualizing contents in the right image so as to be spaced apart from each other based on a binocular disparity. Through this separation, the electronic device 300 may visualize contents having a depth into a 3D graphic object and provide the 3D graphic object to the user.

The input receiver 330 may receive an input of the user. The input receiver 330 may receive an input for calibration of the parallax optical element 320 from a user observing a pattern image in the eyebox. For example, the input receiver 330 may include at least one or a combination of two or more of a touch panel, a touchscreen, a dial, a jog dial, a shuttle dial, a click wheel, a button, a slider bar, and an operation lever. However, an example of the input receiver 330 is not limited to the foregoing, and the input receiver 330 may include various structures that support rotational manipulation (e.g., dial) and/or straight manipulation (e.g., slider bar).

In the present disclosure, the pattern image may be an image representing a pattern for calibration (hereinafter, referred to as a "calibration pattern"), and may be an image obtained by rendering one or more source images including the calibration pattern using the parameter of the parallax optical element. The calibration pattern and the pattern image will be described with reference to FIGS. 4 and 5.

The processor 340 may adjust the parameter of the parallax optical element 320 in response to a change of an LDA θLDA between the eyebox and a virtual image plane formed by the display module 310 and the parallax optical element 320. An operation of the processor 340 is not limited to the foregoing, and will be described in greater detail with reference to FIGS. 4 through 14. Each parameter of the parallax optical element 320 will be described with reference to FIG. 6.

The memory 350 may temporarily or permanently store information required for calibration. For example, the memory 350 may store instructions executed by the processor 340 to perform operations according to FIGS. 4 through 14. In addition, the memory 350 may store calibrated parameters (e.g., the pitch parameter, the slanted angle parameter, and the position offset parameter).

The eye detector may detect a position of an eye (e.g., the left eye and/or the right eye) of the user. The electronic device 300 may provide an image to an eyebox through the display module 310 and the parallax optical element 320. The electronic device 300 may provide a pattern image for calibration to the eyebox. The electronic device 300 may detect a height of gaze of the user through the eye detector and determine a position of the eyebox based on the height of gaze. The eye detector may include, for example, a camera that captures an inside of a vehicle as illustrated in FIG. 2. The eye detector may detect the position of the eye from an image acquired by capturing the inside of the vehicle including the user (e.g., a driver). However, this is merely an example, the processor 340 of the electronic device may receive an inside image captured by a separate internal camera independent of the electronic device 300, and detect and/or track the position of the eye of the received inside image.

The electronic device 300 may include a separate camera module for automatic calibration. The separate camera module may be disposed at a position corresponding to the eyebox in which both eyes of the user are predicted and/or estimated to be located. The separate camera module may capture an observed image, which is obtained from a pattern image output from the display module 310, passing through the parallax optical element 320, and reaching the eyebox, during the calibration of the parameters of the parallax optical element 320. The processor 340 of the electronic device 300 may perform the calibration of the position offset parameter by automatically repeating the adjustment of the position offset parameter of the parallax optical element until a reference line of the calibration pattern included in the image captured by the camera module installed in the eyebox. For example, the processor 340 may repeat an update of the position offset parameter until the reference line of the observed image is located at the center of the calibration pattern. The reference line and the alignment of the calibration pattern will be further described with reference to FIG. 10.

Figure 4:
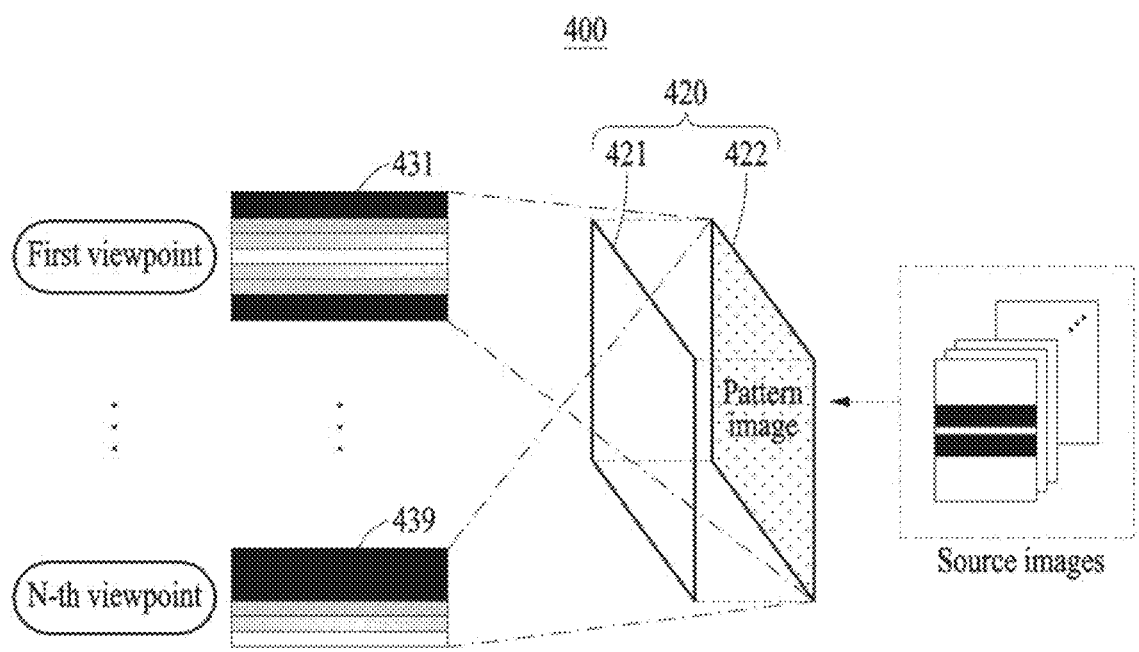
FIG. 4 illustrates an example of a source image, a pattern image, and an observed image for calibration of a parallax optical element according to an example embodiment.

FIG. 4 illustrates an example of a source image, a pattern image, and an observed image for calibration of a parallax optical element according to an example embodiment.

A calibration system 400 may include an electronic device 420. The electronic device 420 may include a parallax optical element 421 (e.g., the parallax optical element 320 of FIG. 3) and a display panel 422 (e.g., the display panel of the display module 310 of FIG. 3).

The electronic device 420 may generate a pattern image based on source images. The source images may be stored in the electronic device 420, or provided to the electronic device 420 by an external device. Each of the source images may correspond to a view. For example, n source images may correspond to a first viewpoint through an n-th viewpoint, respectively. Here, n is an integer greater than or equal to 2. In the present disclosure, a description is mainly given of an example in which n=2, but embodiments are not limited thereto. When an image is provided with only views corresponding to both eyes of one user, n may be equal to 2. As described below, the electronic device 420 may generate a pattern image based on a parameter such that an image corresponding to a reference viewpoint among a plurality of viewpoints corresponding to the source images is observed at the reference viewpoint. For example, the reference viewpoint may be a viewpoint corresponding to the left eye of the user. During the calibration, the user may proceed with a calibration process while observing the pattern image with the left eye and closing the right eye. The reference viewpoint may be located in the eyebox.

The electronic device 420 may display the pattern image through the display panel 422. The pattern image may be understood as a panel image representing a calibration pattern generated based on the source images including a linear pattern. For example, the calibration pattern may be divided and represented in the pattern image. Divided portions of the pattern images may be combined at individual viewpoints through the parallax optical element so that the calibration pattern is observed. Although the calibration pattern is shown as a horizontal line blurred with a certain thickness in observed images 431 and 439 of FIG. 4, this is merely an example. The calibration pattern may be, for example, a vertical line blurred with a certain thickness. As described later, a calibration pattern in a form of the horizontal line and a calibration pattern in a form of the vertical line may be used depending on a type of a parameter.

The calibration pattern may be a pattern in which patterns (e.g., linear patterns) included in one or more source images are combined. For example, the calibration pattern may be a pattern obtained by combining a portion of a pattern of a source image corresponding to another viewpoint based on a pattern of a source image corresponding to the reference viewpoint. The calibration pattern may include a whole pattern of the source image corresponding to the reference viewpoint and include a portion of a pattern of a source image corresponding to a viewpoint (e.g., an (i−1)-th viewpoint and an (i+1)-th viewpoint) adjacent to the reference viewpoint (e.g., an i-th viewpoint). Compared to the pattern of the source image corresponding to the viewpoint adjacent to the reference viewpoint, the calibration pattern may less include a pattern of a source image corresponding to a viewpoint (e.g., the first viewpoint and the n-th viewpoint) far from the reference viewpoint. A human eye may clearly recognize a region based on a focal point and less clearly recognize an ambient region. The calibration pattern set based on an eyebox corresponding to the human eye may be a pattern in which linear patterns of source images of viewpoints are combined by mimicking the aforementioned phenomenon. Accordingly, as described above, the images 431 and 439 observed at the respective viewpoints may relatively clearly represent a linear pattern corresponding to the reference viewpoint and relatively unclearly represent linear patterns corresponding to the adjacent viewpoint and the far viewpoint.

The parallax optical element 421 may convert the pattern image into a 3D image using an autostereoscopic scheme. The parallax optical element 421 may include an optical layer such as a lenticular lens array, a parallax barrier, and a directional backlight unit. For brevity, FIG. 4 illustrates that the parallax optical element 421 is located at the front side of the display panel 422, however, embodiments are not limited thereto. For example, the parallax optical element 421 may also be located at the rear side of the display panel 422 similar to the directional backlight unit.

The parallax optical element 421 may provide a directivity to a light provided to the display panel 422 or output from the display panel 422. Through the directional light, different images may be emitted to a plurality of viewpoints (e.g., viewpoints corresponding to both eyes of a viewer), so that the viewer feels a 3D effect. In the autostereoscopic scheme, when different images are not accurately emitted to both eyes of the user, crosstalk may occur in the 3D image. For example, the crosstalk may occur when an error is generated between a designed value and an actual value of the electronic device 420 in a process of manufacturing or installing the electronic device 420.

For example, an image corresponding to a first pattern image generated by rendering one or more source images including a first source image may be observed at the first view, and an image corresponding to an n-th pattern image generated by rendering one or more source images including an n-th source image may be observed at the n-th viewpoint. A first observed image, for example, the observed image 431 may be an image observed when a light corresponding to the first pattern image passes through the parallax optical element 421 and reaches the first viewpoint. An n-th observed image, for example, the observed image 439 may be an image observed when a light corresponding to the n-th pattern image passes through the parallax optical element 421 and reaches the n-th viewpoint. A pattern image corresponding to one viewpoint (e.g., the reference viewpoint) may be displayed in portions through which a light directed from the display panel 422 toward the corresponding viewpoint passes. For example, the calibration pattern in the pattern image may be divided and represented as portions through which a light directed from the display panel 422 toward the reference viewpoint passes. The light corresponding to the divided portions of the calibration pattern may be combined at the reference viewpoint while passing through the parallax optical element 421, so that the user observes the calibration pattern at the reference viewpoint. For example, the reference viewpoint may be a viewpoint corresponding to a first eye (e.g., the left eye), and the eyebox may include the reference viewpoint and another viewpoint (e.g., a viewpoint corresponding to a second eye which is the right eye) that pairs with the reference viewpoint.

The electronic device 420 may detect a reference eye's position of the user. For example, the electronic device 420 may detect a position of the eye of the user through a separate camera (e.g., the eye detector 217 of FIG. 2) installed in the electronic device 420 or near the electronic device 420. The electronic device 420 may perform rendering such that the pattern image is observed at the reference viewpoint corresponding to the detected position of the eye of the user.

Figure 5:
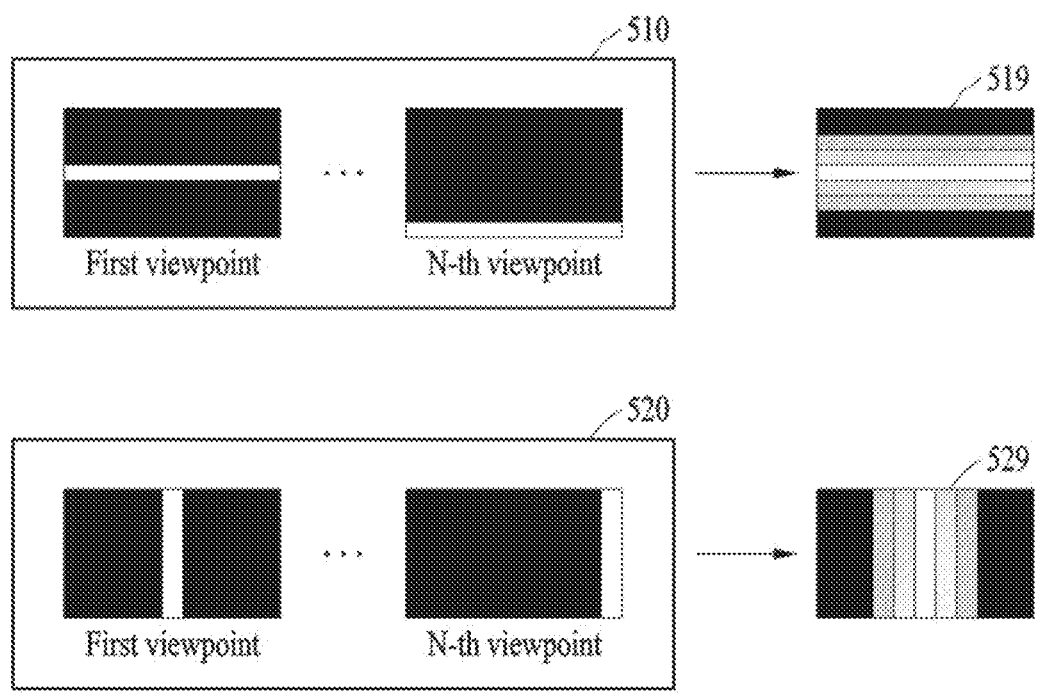
FIG. 5 illustrates an example of a source image and an observed image according to an example embodiment.

FIG. 5 illustrates an example of a source image and an observed image according to an example embodiment.

First source images 510 and second source images 520 may correspond to a plurality of viewpoints (a first viewpoint through an n-th viewpoint). The first source images 510 may include linear patterns in a form of a horizontal line at different positions based on corresponding viewpoints, respectively. The second source images 520 may include linear patterns in a form of a vertical line at different positions based on corresponding viewpoints, respectively. The first source images 510 may be used for generating a first pattern image, and the second source images 520 may be used for generating a second pattern image. As an example, for calibration at an i-th viewpoint, an electronic device may generate the first pattern image corresponding to the i-th viewpoint by rendering one or more source images including a first source image corresponding to the i-th viewpoint using a parameter of a parallax optical element. Here, i may be an integer greater than or equal to 1 and less than or equal to n. As another example, the electronic device may generate a second pattern image corresponding to the i-th viewpoint by rendering one or more source images including a second source image corresponding to the i-th viewpoint using a parameter of the parallax optical element.

For example, when calibrating an individual parameter among a plurality of parameters, a calibration pattern, which is easy to determine whether the corresponding parameter is calibrated, may be present. The first source images 510 may include a black region in a remaining region other than the horizontal line. The second source images 520 may include a black region in a remaining region other than the vertical line. The first source images 510 may be easier to calibrate a pitch parameter, and the second source images 520 may be easier to calibrate a slanted angle parameter. A linear pattern of a source image corresponding to a reference viewpoint among the source images may be changed to another color (e.g., green) different from a color (e.g., white) of a linear pattern of another viewpoint.

The electronic device (e.g., the electronic device 300 of FIG. 3) may generate a pattern image through light field rendering such that a source image corresponding to the reference viewpoint is represented at the reference viewpoint. With reference to FIG. 5, an example in which the reference viewpoint is the first view and a pattern image is rendered with respect to the first viewpoint will be described. When it is assumed that the pattern image is output in a state in which the calibration of the parameter is completed, the user may view a first observed image 519 and a second observed image 529 at the reference viewpoint. In an ideal environment, the first observed image 519 and the second observed image 529 may be the same as the calibration pattern obtained by combining the source images to correspond to the reference viewpoint. In an actual environment in which crosstalk exists, however, the first observed image 519 and the second observed image 529 may be observed in a form that more gradation is added to the calibration pattern corresponding to the reference viewpoint or the calibration pattern is more blurred. An example of rendering performed using a parameter on which calibration is completed has been described with reference to FIG. 5. In this example, the calibration pattern is observed as the horizontal line (e.g., a horizontal line blurred with a certain thickness) in the first observed image 519, and the calibration pattern is observed as the vertical line (e.g., a vertical line blurred with a certain thickness) in the second observed image 529. If the calibration has not been completed yet, each linear calibration pattern may be observed as an inclined linear pattern instead of the vertical line or the horizontal line. Parameters for aligning a calibration pattern will be described with reference to FIG. 6.

Figure 6:
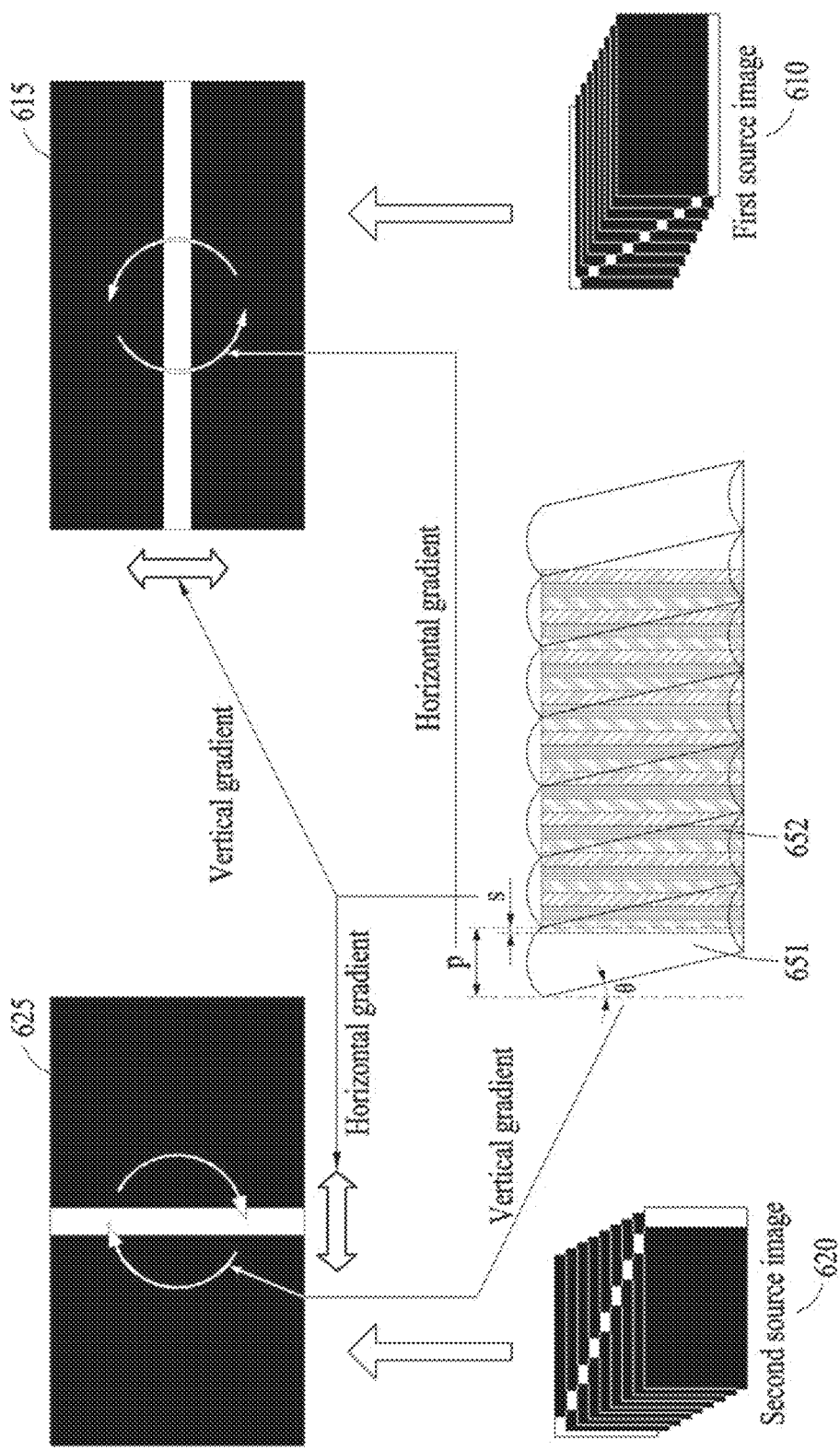
FIG. 6 illustrates an example of parameters of a parallax optical element according to an example embodiment.

FIG. 6 illustrates an example of parameters of a parallax optical element according to an example embodiment.

A first observed image 615 based on a first source image 610 may be viewed by a user, and a second observed image 625 based on a second source image 620 may be acquired. Unlike FIG. 5 shown with crosstalk, FIG. 6 illustrates the first observed image 615 and the second observed image 625 observed in a calibration-completed state and in an ideal crosstalk-free environment.

A parameter of an electronic device (e.g., the electronic device 300 of FIG. 3) may also be referred to as a parameter of a parallax optical element 651 (e.g., the parallax optical element 320 of FIG. 3). Parameters of the parallax optical element 651 may include a pitch parameter, a slanted angle parameter, and a position offset parameter. Among the parameters of the parallax optical element 651, a thickness is assumed to be fixed.

The pitch parameter may be a parameter indicating a pitch p of a unit element of the parallax optical element 651. The parallax optical element 651 may include unit elements. The unit element may be a unit optical element that gives a directivity to a light corresponding to an image output through a display module 652 and may include, for example, a slit of a parallax barrier and a unit lens of a lenticular lens. The unit elements may be periodically arranged along one axis on a plane corresponding to an optical layer disposed on one face of the display module 652. The pitch parameter may represent an interval of the periodical arrangement of the unit elements. In FIG. 6, the pitch parameter may represent a horizontal period of the unit element. A length of an interval in which a view is repeated in a 3D image may be determined based on the pitch. Through the pitch parameter, a gradient (e.g., a horizontal gradient) of a linear pattern in the first observed image 615 may be adjusted. For example, a linear calibration pattern corresponding to a pattern image may be rotated through an adjustment of the pitch parameter.

The slanted angle parameter may represent a gradient of the unit element of the parallax optical element 651 with respect to a reference axis of the display module 652. In FIG. 6, the reference axis of the display module 652 is shown as a vertical axis, and a slanted angle θ may represent a gradient formed by a unit element with respect to the vertical axis. Through the slanted angle parameter, a gradient of a linear pattern in the second observed image 625 may be adjusted.

The position offset parameter may represent relative positions between the parallax optical element 651 and the display module 652. For example, the position offset parameter may represent a position offset s between a start position of the unit element and a start pixel of the display module 652. FIG. 6 illustrates a horizontal offset between a start position of a left unit element based on a left upper start pixel of the display module 652. The electronic device may adjust a vertical position of a linear pattern in the first observed image 615 and a horizontal position of a linear pattern in the second observed image 625 through the position offset parameter.

A processor of the electronic device may provide, to a user, at least one or a combination of two or more of the first pattern image corresponding to the pitch parameter, the second pattern image corresponding to the slanted angle parameter, and a third pattern image corresponding to the position offset parameter. The first pattern image may be generated based on first source images, each including a horizontal line. The second pattern image may be generated based on second source images, each including a vertical line. The third pattern image may be generated as a calibration pattern including one of the vertical line and the horizontal line. As described below, the pitch parameter may be calibrated independently of other parameters through a horizontal pattern. In addition, when the pitch parameter is calibrated, the slanted angle parameter may be calibrated independently of other parameters through a vertical pattern. The electronic device may provide at least two of the first pattern image, the second pattern image, and the third pattern image at the same time, and may also provide the images one by one sequentially. For example, as described later, the present disclosure mainly describes an operation of adjusting and/or calibrating the position offset parameter using the third pattern image after calibration and/or adjustment of the pitch parameter and the slanted angle parameter is completed. The below-described pattern image may indicate the third pattern image for calibration of the position offset parameter.

A sequential calibration process using a horizontal pattern and a vertical pattern may be more efficiently performed at a relatively low resolution compared to a calibration process using other complicated patterns such as a check pattern. This is because calibration using the horizontal pattern and calibration using the vertical pattern are separately performed, which may lead to a simplification of the calibration process. An autostereoscopic 3D image technique may be implemented in a low-resolution device such as an HUD. In terms of the HUD, a viewing distance may be longer compared to a general display device, and a resolution may be insufficient to estimate a parameter using one pattern image. In addition, due to a catadioptric system included in an HUD device, a distortion may occur in a 3D image. In the example embodiments, since the calibration is performed through a simple pattern in sequence, a relatively high performance may be achieved by such a low-resolution device or a device including an optical system.

Figure 7:
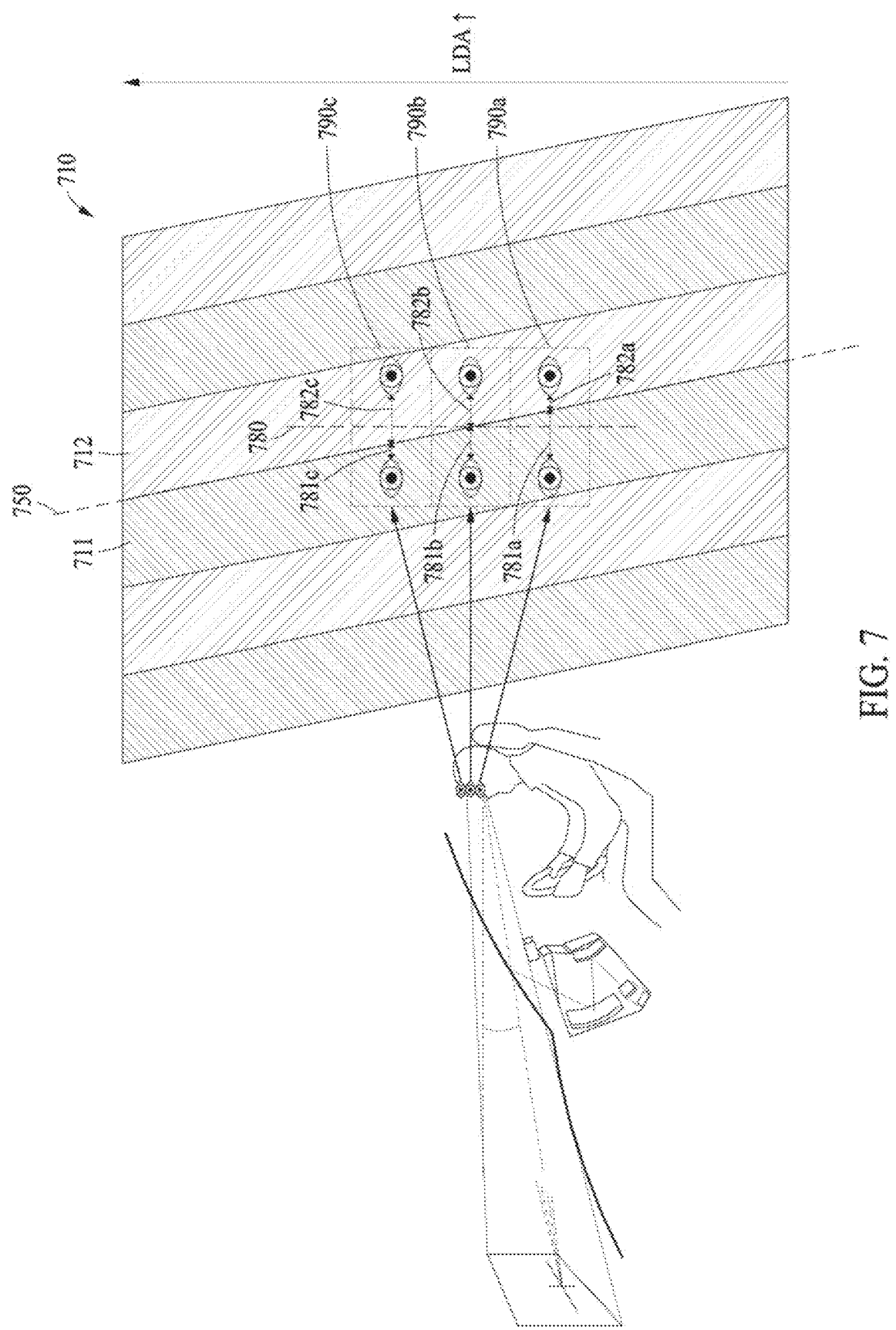
FIG. 7 illustrates an example of a change of a look down angle (LDA) and a change of a distance between both eyes in an eyebox according to an example embodiment.

FIG. 7 illustrates an example of a change of a look down angle (LDA) and a change of a distance between both eyes in an eyebox.

An electronic device may provide images 710 to a user for each of a plurality of viewpoints through an optical system formed by a display module. For example, the electronic device may provide a right image 711 and a left image 712. For ease of description, the right image 711 and the left image 712 are vertically exaggerated in FIG. 7. A user may view the right image 711 and the left image 712 in an eyebox. As described above, a position of the eyebox may be changed by driving an optical system of a display module.

As described above, an LDA may be changed based on a position of the eyebox. When it is assumed that a height of a vertical image plane is fixed, the LDA may increase according to an increase in the height of the eyebox. When a binocular separation boundary 750 between the right image 711 and the left image 712 is located at an intermediate point 780 between both eyes of a user in the eyebox, crosstalk may be minimized.

For example, as illustrated in FIG. 7, in a second eyebox 790b, a distance 781b from the right eye to the binocular separation boundary 750 may be the same as a distance 782b from the left eye to the binocular separation boundary 750. Since a first eyebox 790a is located to be lower than the second eyebox 790b, the user of the first eyebox 790a may view the right image 711 and the left image 712 at a decreased LDA. In the first eyebox 790a, a distance 781a from the left eye to the binocular separation boundary 750 may be greater than a distance 782a from the right eye to the binocular separation boundary 750. Since a third eyebox 790c is located to be higher than the second eyebox 790b, a user of the third eyebox 790c may view the right image 711 and the left image 712 at an increased LDA. In the third eyebox 790c, a distance 781c from the left eye to the binocular separation boundary 750 may be less than a distance 782c from the right eye to the binocular separation boundary 750. Accordingly, in response to a change of the position of the eyebox, a distance from each eye of the user to the binocular separation boundary 750 may be changed, which may cause the crosstalk.

Through the below-described calibration of the position offset parameter, the binocular separation boundary may be prevented from being biased to one eye.

Figure 8:
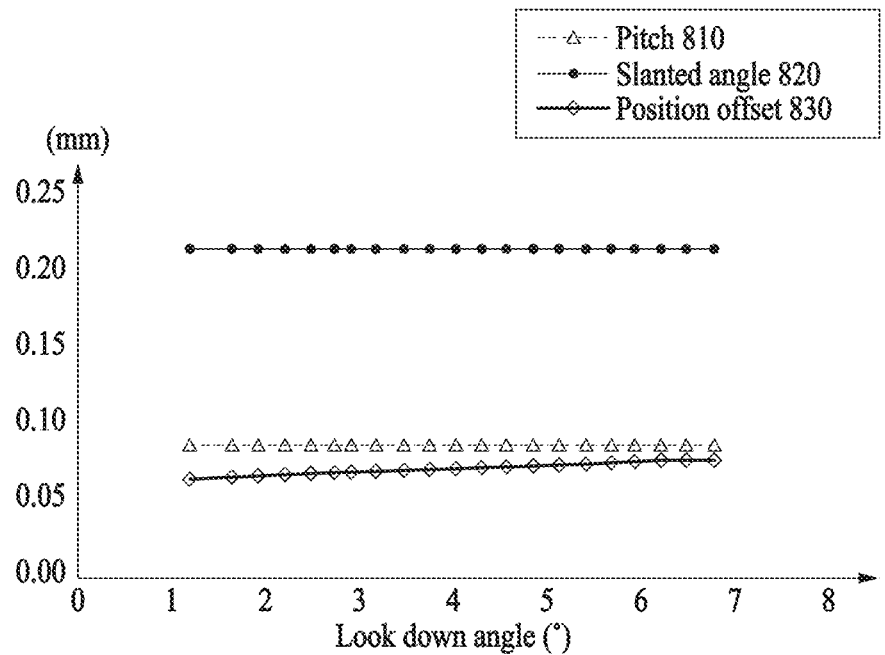
FIG. 8 illustrates an example of a relationship between parameters of a parallax optical element and a change of an LDA according to an example embodiment.

FIG. 8 illustrates an example of a relationship between parameters of a parallax optical element and a change of an LDA according to an example embodiment.

A graph of FIG. 8 may show values of parameters of a parallax optical element minimizing crosstalk for each LDA.

A horizontal axis represents a degree of an LDA, and a vertical axis represents a value of each parameter. Values of respective parameters may be individually acquired through calibration using pattern images (e.g., the first pattern image through the third pattern image). As illustrated in FIG. 8, even when the LDA is changed, values of a slanted angle parameter 820 and a pitch parameter 810 may be maintained in each calibration. In contrast, a position offset parameter 830 acquired through the calibration for each LDA may linearly increase as the LDA increases. For example, when the LDA is changed, the position offset parameter may be adjusted among the parameters of the parallax optical element.

A processor of an electronic device may adjust the position offset parameter among the parameters of the parallax optical element in response to the change of the LDA. The electronic device may load a value of the position offset parameter previously recorded with respect to the changed LDA or perform calibration based on the calibration pattern with respect to the changed LDA, thereby acquiring the value of the position offset parameter. Calibration of a position offset will be described with reference to FIG. 10.

Figure 9:
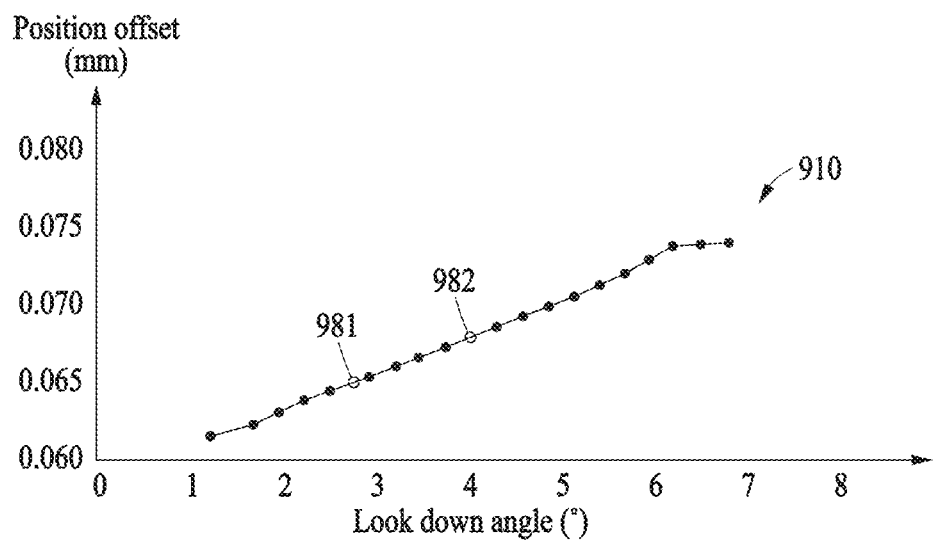
FIG. 9 illustrates an example of building an LDA model according to an example embodiment.

FIG. 9 illustrates an example of building an LDA model according to an example embodiment.

A processor of an electronic device may determine a value of the position offset parameter allowing an alignment of the calibration pattern at the changed LDA by performing the calibration of the position offset parameter through the calibration pattern based on the changed LDA in response to the LDA changing. For example, the electronic device may provide the calibration pattern toward an eyebox corresponding to the changed LDA. The calibration of the position offset parameter will be described below with reference to FIG. 10. When the calibration is performed at an individual LDA, the electronic device may record a value of the position offset parameter determined as a result of calibration for the corresponding LDA. In response to the value of the position offset parameter being recorded according to the calibration previously performed at the changed LDA, the processor of the electronic device may load the previously recorded value of the position offset parameter with respect to the changed LDA. The electronic device may skip the calibration for the LDA for which the calibration has been performed and render a content image by loading and using the position offset parameter recorded through the previous calibration. Accordingly, the electronic device may quickly adjust the position offset parameter to a value that minimizes crosstalk at an LDA while minimally performing the calibration when the corresponding LDA is changed.

The processor of the electronic device may build an LDA model by individually performing the calibration of the position offset parameter at different LDAs. For example, the electronic device may acquire a first position offset value 981 through the calibration with respect to a first LDA and acquire a second position offset value 980 with respect to a second LDA. As described with reference to FIG. 8, the LDA and the calibrated value of the position offset parameter may have a linear relationship within a limited angle range. When calibrated values of the position offset parameter are acquired for two LDAs, the electronic device may estimate values of the position offset parameter for remaining LDAs based on a linearity. Through this, the electronic device may build the LDA model 910 representing the linear relationship between the LDA and the position offset parameter.

For example, the LDA model 910 may be effective in a limited range (e.g., in FIG. 9, a range greater than or equal to 1° and less than or equal to 6°) of LDA. The LDA model 910 may be modeled according to, for example, y=ax+b. In FIG. 9, linear coefficients of the LDA model 910 may be a=0.0024 and b=0.0584, respectively. The electronic device may build a different LDA model 910 for an LDA that exceeds the limited range, or record and manage calibrated values of the position offset parameter for each LDA.

When the LDA is changed after the LDA model 910 is generated, the electronic device may determine a value of the position offset parameter for the changed LDA using the LDA model 910. For example, the processor of the electronic device may skip provision of the calibration pattern in response to the LDA model 910 representing the linear relationship between the LDA and the position offset parameter being accessible. The LDA model 910 may be stored in a memory and/or an external server of the electronic device. In response to the LDA model 910 being accessed, the electronic device may determine a position offset parameter for an LDA converted based on the LDA model 910. The electronic device may render a content image using a value of the position offset parameter and provide the rendered content image to the eyebox.

For example, the electronic device may perform calibration at different LDAs designated directly by a user and build a new LDA model 910 based on a result thereof. The electronic device may replace the existing LDA model 910 with the new LDA model 910.

Figure 10:
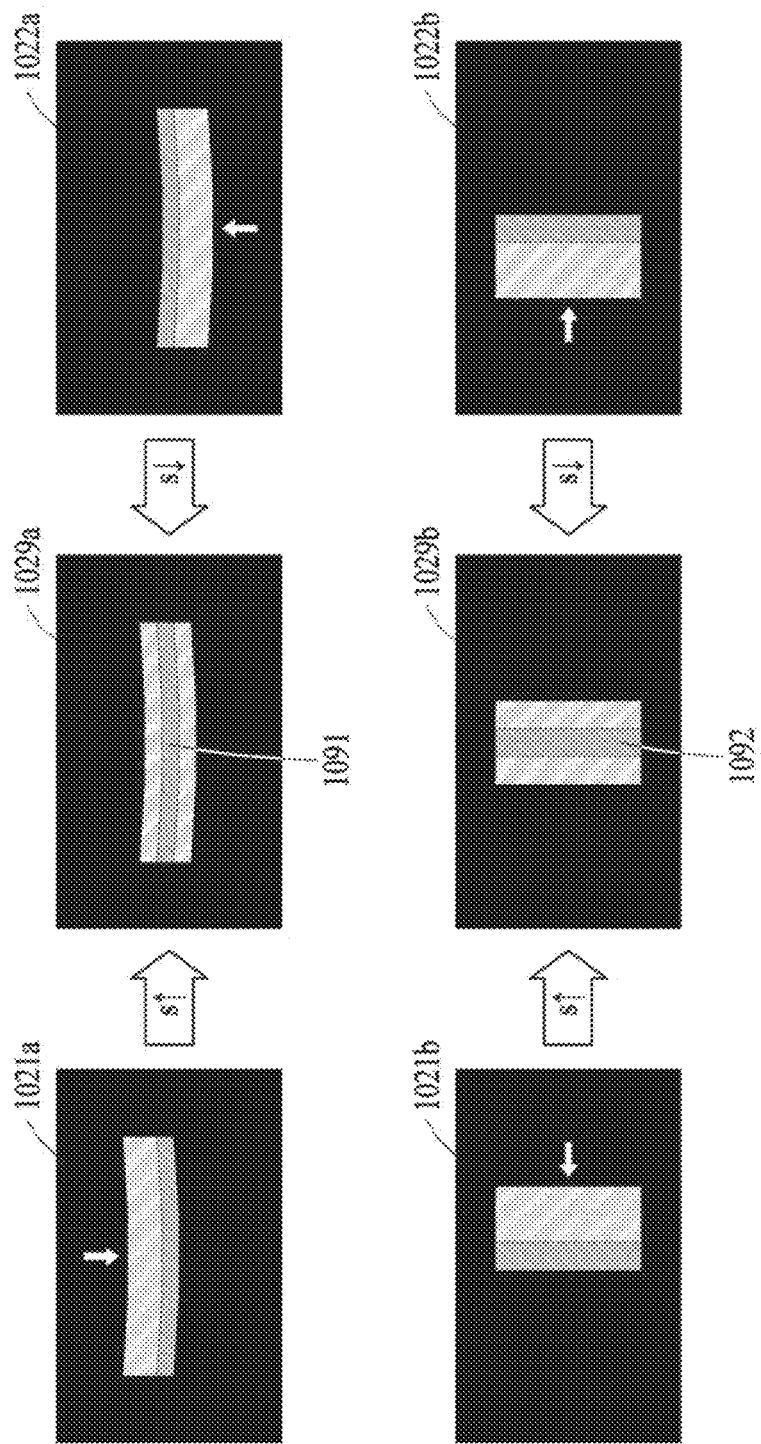
FIG. 10 illustrates an example of a change of a calibration pattern observed in an eyebox according to an adjustment of a position offset parameter according to an example embodiment.

FIG. 10 illustrates an example of a change of a calibration pattern observed in an eyebox according to an adjustment of a position offset parameter according to an example embodiment.

If calibration of a position offset parameter is not completed, calibration patterns of which positions are not aligned in observed images 1021a, 1022a, 1021b, and 1022b may be observed by a user. For example, calibration patterns combined for an eyebox may be a linear pattern (e.g., a single vertical line pattern or a single horizontal line pattern having a thickness). In a linear pattern having a thickness, a reference line may be observed at a position deviated from the center. For example, a pattern image for calibration of the position offset parameter may be rendered using one or more first source images or rendered using one or more second source images. When one of a vertical pattern and a horizontal pattern is aligned to the center, a remaining one of the vertical pattern and the horizontal pattern may also be aligned to the center. Thus, the position offset parameter may be adjusted using one of the vertical pattern and the horizontal pattern. For example, the position offset parameter may not affect a gradient of the linear pattern. The position offset parameter may be adjusted independently of a pitch parameter and a slanted angle parameter.

When the position offset parameter is changed, a pattern (e.g., the linear pattern) may be moved while a position of the reference line is fixed in the observed image. For example, the electronic device may change the position offset parameter of the parallax optical element in response to an input of the user, and output a new pattern image generated by rendering one or more source images including a first source image or a second source image using the changed position offset parameter. As illustrated in FIG. 10, when a setting value of the position offset parameter is changed, in calibrated images 1029a and 1029b corresponding to a new pattern image, a pattern moved in one direction from a linear pattern of a first observed image. For example, the observed images 1021a, 1022a, 1021b, and 1022b corresponding to a previous pattern image may be observed. Even when the calibration pattern is moved, reference lines

1091 and 1092 may be fixed without moving, and relative positions between the reference line and the pattern may be changed based on the reference line.

For example, when rendering view images (e.g., source images) corresponding to n viewpoints (e.g., 17 viewpoints), the electronic device may visualize a linear pattern of a view image (e.g., an eighth view image) corresponding to an i-th viewpoint which is a reference viewpoint, with a reference color (e.g., green). The reference color may be a color distinguished from a color of a linear pattern of another source image. The calibration pattern may be a pattern observed at one viewpoint (e.g., the reference viewpoint in the eyebox) among partial images obtained by dividing a panel image (e.g., a pattern image) into n equal portions, which is generated and output by rendering view images corresponding to total n viewpoints. In the calibration pattern, the reference lines 1091 and 1092 may represent a linear pattern of an intermediate view image (e.g., a view image corresponding to an eights viewpoint at the middle of 17 viewpoints) among view images reaching a human eye located at the reference viewpoint.

A processor may move a pattern corresponding to a pattern image in one direction from a user's observation direction in response to the position offset parameter increasing among the parameters of the parallax optical element according to an input. For example, when a pattern corresponding to a pattern image is a horizontal pattern, and when the position offset parameter is increased, the electronic device may provide a calibrated image 1029a obtained by moving a pattern of the observed image 1021a in a first direction (e.g., a downward direction). When a pattern corresponding to a pattern image is a vertical pattern, and when the position offset parameter is increased, the electronic device may provide a calibrated image 1029b obtained by moving a pattern of a different third observed image, for example, the observed image 1021b in a third direction (e.g., a direction from right to left).

In addition, in response to the position offset parameter decreasing among the parameters of the parallax optical element according to an input, the electronic device may move a pattern corresponding to a pattern image in another direction opposite to one direction from the user's observation direction. As an example, when a pattern corresponding to a pattern image is a horizontal pattern, and when the position offset parameter is decreased, the position offset parameter, the electronic device may provide the calibrated image 1029a obtained by moving a pattern of a second observed image, for example, the observed image 1022a in a second direction (e.g., an upward direction) opposite to the first direction. When a pattern corresponding to a pattern image is a vertical pattern, and when the position offset parameter is decreased, the electronic device may provide the calibrated image 1029b obtained by moving a pattern of another second observed image, for example, the observed image 1022b in a fourth direction (e.g., a direction from left to right).

The processor of the electronic device may adjust the position offset parameter of the parallax optical element in response to an input and render the calibration pattern according to the adjusted parameter, thereby outputting a changed pattern image through a display module. Through the adjustment of the position offset parameter, the electronic device may move a position of the calibration pattern such that the reference lines 1091 and 1092 are located at the center of the calibration pattern. When a calibration terminating input is received from the user, the processor may determine that the calibration of the position offset parameter is completed. For example, whether the calibration pattern and the reference lines 1091 and 1092 are aligned may be determined by the user. However, the reference lines 1091 and 1092 may not be required to be presented. For example, the electronic device may receive an adjustment input of the position offset parameter from the user such that the reference line is disposed at the center of the linear pattern of the calibration pattern observed by the user during the calibration of the position offset parameter. For example, the adjustment may be performed to be aligned to the center (e.g., a position corresponding to the reference line) of a range (e.g., a field of view) in which the calibration pattern corresponding to the pattern image is observed through an eye of the user.

The electronic device may output a slider bar interface through a touchscreen. The electronic device may receive, from the user, a touch input of moving a slider bar object on the touchscreen. As an example, the electronic device may increase a parameter in response to the slider bar object being moved in one direction (e.g., a direction from left to right) by a user input. As another example, the electronic device may decrease a parameter in response to the slider bar object being moved in another direction (e.g., a direction from right to left) by a user input.

The processor may map an adjustment of the position offset parameter to an input module capable of detecting a straight-line manipulation in an input receiver. The input receiver may include a plurality of input modules, and the electronic device may select an input module configured to detect a straight-line manipulation (e.g., linear manipulation) from the plurality of input modules. For example, the processor may output a graphic representation guiding the straight-line manipulation on the touch screen during the calibration for the position offset parameter. The processor may output the slider bar interface through the calibration of the position offset parameter as the graphic representation. The processor may adjust the position offset parameter in response to a linear movement of a touch point from one point to another point on the touchscreen being detected to correspond to the graphic representation. For example, the processor may increase the position offset parameter when the graphic representation is moved in one direction and decrease the position offset parameter when the graphic representation is moved in the other direction. When the movement of the graphic representation in one direction is detected, the electronic device may linearly move the calibration pattern in the one direction. Similarly, the electronic device may linearly move the calibration pattern in the other direction when the movement of the graphic representation in the other direction is detected.

An example of a straight-line manipulation in the touch interface has been described, however, embodiments are not limited thereto. The electronic device may also perform mapping between a physical manipulation interface (e.g., a dial interface) and a parameter adjustment. The input receiver of the electronic device may include a dial interface. In the dial interface, a dial knob may be coupled to the electronic device to be rotatable clockwise or counterclockwise. In addition, the dial knob may be coupled to the electronic device to move along one axis. For example, the dial interface may detect both rotational manipulation and straight-line manipulation. The electronic device may adjust the position offset parameter in response to the straight-line manipulation being detected in the dial interface. For example, in response to the input receiver detecting the straight-line manipulation in one direction while providing a pattern image corresponding to the position offset parameter, the electronic device may increase the position offset parameter, thereby moving a calibration pattern corresponding to the pattern image in a direction corresponding to the one direction. In addition, in response to the input receiver detecting the straight-line manipulation in another direction opposite to the one direction while providing the pattern image corresponding to the position offset parameter, the electronic device may decrease the position offset parameter, thereby moving the calibration pattern corresponding to the pattern image in a direction corresponding to the other direction.

An example of the user input is not limited to the foregoing, and the electronic device may receive an input for calibration through a button attached to a steering wheel of a vehicle, and various levers and/or buttons arranged on a center fascia. In addition, although a description is given of an example of mapping the straight-line manipulation to the adjustment of the position offset parameter, embodiments are not limited thereto. For example, the rotational manipulation may also be mapped thereto.

In addition, although the parameter calibration performed in response to a user's manual input has been mainly described above, the calibration of the position offset parameter is not limited to an operation by the user input. As another example, the electronic device may observe the calibration pattern through a separate camera module disposed to face the same direction as the user in the eyebox. The electronic device may adjust the parameter of the parallax optical element based on an observed result. For example, the electronic device may increase or decrease the position offset parameter based on an observed image, and observe a result re-rendered using a changed position offset parameter through the separate camera module. By repeating the aforementioned automatic calibration operation, the electronic device may acquire a calibrated value of the position offset parameter at each LDA without intervention of the user.

Figure 11:
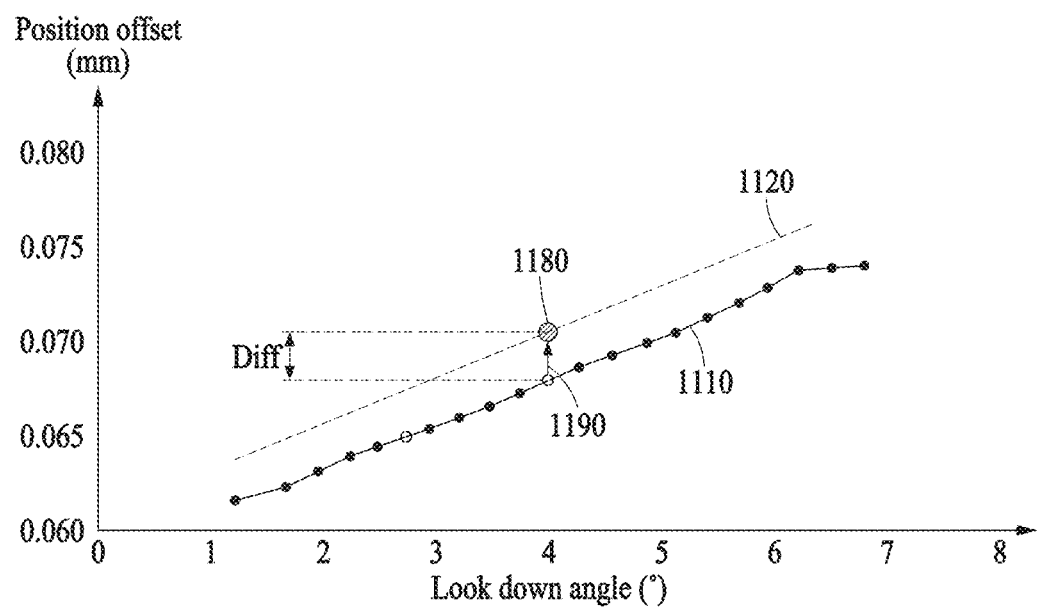
FIG. 11 illustrates an example of a compensation of a previously built LDA model according to an example embodiment.

FIG. 11 illustrates an example of a compensation of a previously built LDA model according to an example embodiment.

A processor of an electronic device according to an example embodiment may compensate a previously built LDA model based on a difference Diff between a previously built LDA model and a result of calibration performed on a position offset parameter through a calibration pattern with respect to an LDA of an individual user. For example, the electronic device may acquire a value 1180 obtained by calibrating one LDA, through the calibration of the position offset parameter described above. The electronic device may calculate a difference Diff 1190 between the previously built LDA model 1110 and a value obtained by calibrating the position offset parameter at the corresponding LDA. The electronic device may shift a linear model of the previously built LDA model 1110 using the calculated difference Diff 1190, so as to acquire a corrected LDA 1120. The electronic device may vertically translate the linear model. The previously built LDA model 1110 may be built through calibration at a time of manufacturing an electronic device and/or instruments (e.g., a vehicle) including the electronic device.

Through this, the electronic device may provide an individual user with an LDA model 1120 personalized to the corresponding user by performing calibration at one LDA only once. Since a number of calibrations required to the user is reduced, a user convenience may increase.

Figure 12:
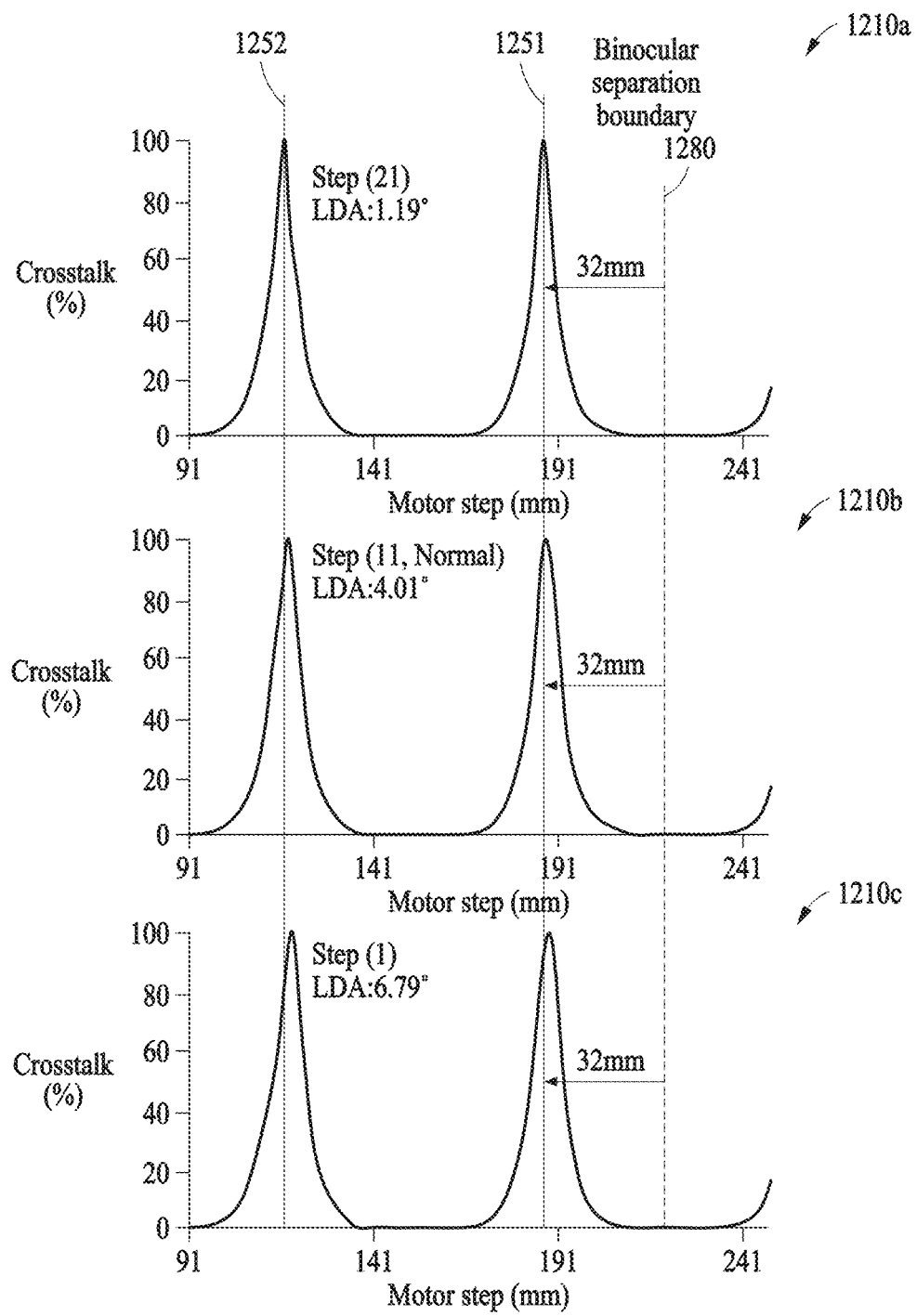
FIG. 12 illustrates an example of a change of a distance between eyes of a user and a binocular separation boundary in a case in which a position offset parameter is adjusted in response to an LDA changing according to an example embodiment.

FIG. 12 illustrates an example of a change of a distance between eyes of a user and a binocular separation boundary in a case in which a position offset parameter is adjusted in response to an LDA changing according to example embodiments.

An electronic device may provide a consistent binocular separation distance for each LDA through the adjustment of the position offset parameter described above. In FIG. 7, a vertical axis may represent a proportion of crosstalk and a horizontal axis may represent a driving step of a motor that drives a magnifying mirror. As described above, the driving step of the motor may correspond to an LDA. The binocular separation distance may indicate a distance from a binocular separation boundary 1251 to each eye of the user. As illustrated in FIG. 12, in a first LDA 1210a, a second LDA 1210b, and a third LDA 1210c, a distance from the binocular separation boundary 1251 to a left eye 1280 may be constantly maintained, for example, at intervals of 32 mm. For example, a boundary line 1252 may indicate a boundary between the right-eye-image 711 and another left-eye image located at a left side of the right-eye image 711 as shown in FIG. 7. In addition, the binocular separation boundary 1251 may indicate the binocular separation boundary 750 of FIG. 7.

Figure 13:
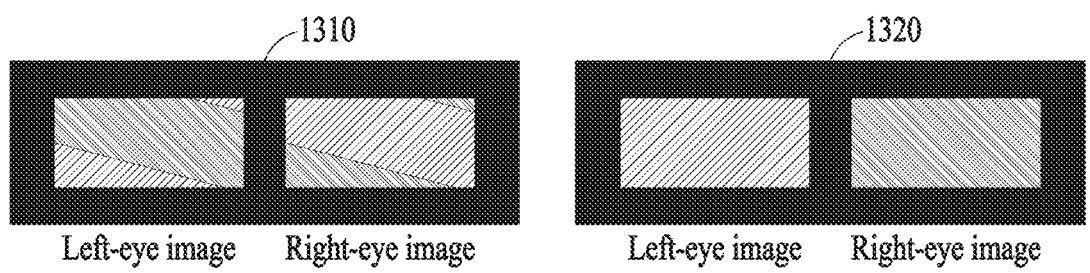
FIG. 13 illustrates an example of a parameter adjustment result according to an example embodiment.

FIG. 13 illustrates an example of a parameter adjustment result according to an example embodiment.

As indicated by a box 1310, before calibration of a parallax optical element is completed, contents may partially overlap in a left-eye image and a right-eye image. As indicated by a box 1320, when the calibration of the parallax optical element is completed, a left-eye image and a right-eye image may respectively show the contents without overlapping, and crosstalk may be removed.

A processor may store parameters personalized to a user of the parallax optical element in response to a calibration completion input being received from the user. The electronic device may render a content image using the personalized parameter and output the content image to a display module. By providing feedback on the calibration pattern and the interface described with reference to FIGS. 4 through 12, the user may intuitively and manually adjust parameters of the parallax optical element with increased ease.

Figure 14:
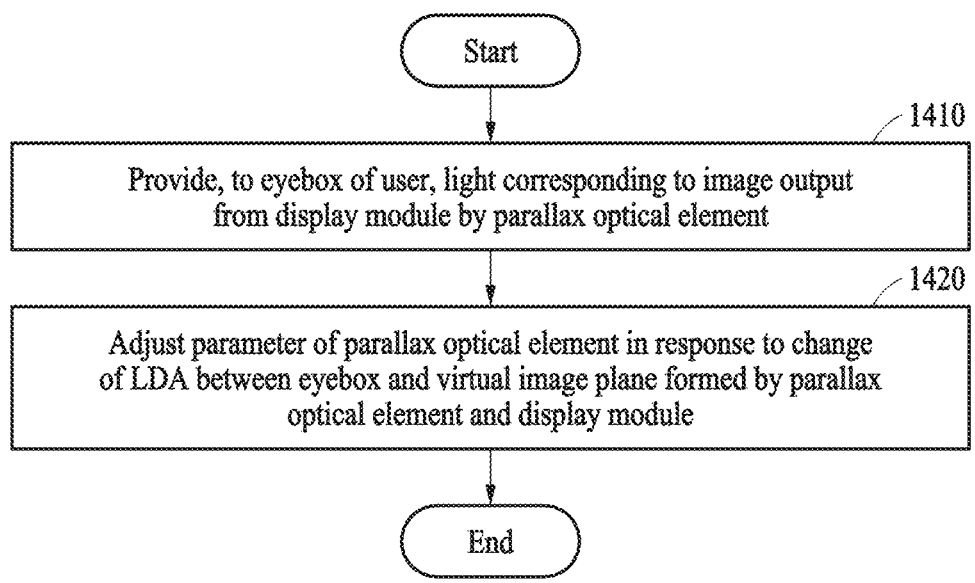
FIG. 14 is a flowchart illustrating an example of a parameter adjustment method.

FIG. 14 is a flowchart illustrating an example of a parameter adjustment method according to an example embodiment.

In operation 1410, an electronic device may provide, to an eyebox of a user, a light corresponding to an image output from a display module by a parallax optical element.

In operation 1420, the electronic device may adjust a parameter of a parallax optical element in response to a change of an LDA between an eyebox and a virtual image plane formed by the parallax optical element and the display module. For example, a processor of the electronic device may maintain values of a pitch parameter and a slanted angle parameter in response to the change of the LDA. As described with reference to FIG. 8, even when the LDA is changed, values of the pitch parameter and the slanted angle parameter required for crosstalk minimization remain constant, and thus, may not be adjusted.

In addition, the processor of the electronic device may precede and complete calibration of the pitch parameter and the slanted angle parameter among parameters of the parallax optical element before operation 1410. In response to the change of the LDA, the electronic device may initiate calibration of a position offset parameter while the pitch parameter and the slanted angle parameter are fixed. As described with reference to FIG. 8, even when the LDA is changed, the values of the pitch parameter and the slanted angle parameter required for crosstalk minimization are constant and thus, additional calibration may not be required. Accordingly, the electronic device may minimally perform repetitive calibration when the LDA is changed.

However, the operation of the electronic device is not limited to that described in FIG. 14, and the operation may be performed in time series and/or in parallel with at least one of the operations described above with reference to FIGS. 1 through 13.

The examples described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. The description of a processing device is used as singular; however, a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave configured to provide instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter.

The above-described hardware devices may be configured to act as one or more software modules in order to perform the operations of the above-described examples, or vice versa.

While this disclosure includes example embodiments, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example embodiment are to be considered as being applicable to similar features or aspects in other embodiments. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An electronic device comprising:
   a display device configured to output an image;
   a parallax optical element configured to provide a light corresponding to the image output from the display device, to an eyebox of a user; and
   a processor configured to adjust a parameter of the parallax optical element based on a change of a look down angle (LDA) between the eyebox and a virtual image plane formed by the display device and the parallax optical element.

2. The electronic device of claim 1, wherein the processor is further configured to:
   acquire a linear LDA model based on a first position offset parameter and a second position offset parameter that are measured when the LDA between the eyebox and the virtual image plane has a first angle value and a second angle value, respectively; and
   in response to the change of the LDA, adjust a position offset parameter of the parallax optical element by applying the changed LDA to the linear LDA model.

3. The electronic device of claim 1, wherein, based on the LDA changing, the processor is further configured to:
   perform calibration of a position offset parameter through a calibration pattern based on the changed LDA; and
   obtain a value of the position offset parameter that aligns the calibration pattern at the changed LDA.

4. The electronic device of claim 1, wherein, based on a position offset parameter value being recorded according to calibration previously performed at the changed LDA, the processor is further configured to load the position offset parameter value previously recorded corresponding to the changed LDA.

5. The electronic device of claim 1, wherein the processor is further configured to:
   skip provision of a calibration pattern based on the processor being accessible to an LDA model representing a linear relationship between an LDA and a position offset parameter; and
   obtain a position offset parameter for an LDA converted based on the LDA model.

6. The electronic device of claim 5, wherein the processor is further configured to build the LDA model by individually performing calibration of a position offset parameter of a plurality of LDAs that are different from each other.

7. The electronic device of claim 5, wherein the processor is further configured to compensate a previously built LDA model based on a difference between the previously built LDA model and a result of calibration of the position offset parameter through a calibration pattern for an LDA by the user.

8. The electronic device of claim 1, further comprising:
an input receiver configured to receive an input for calibration for the parallax optical element from the user observing a pattern image in the eyebox,
wherein the processor is further configured to:
adjust a position offset parameter of the parallax optical element based on the input;
render a calibration pattern again based on an adjusted parameter; and
output a changed pattern image through the display device.

9. The electronic device of claim 8, wherein the processor is further configured to:
move a pattern corresponding to a pattern image in one direction from a direction of the user's observation, based on the position offset parameter increasing according to a first user input received by the input receiver, and
move a pattern corresponding to a pattern image in another direction, which is opposite to the one direction, from the direction of the user's observation, based on the position offset parameter decreasing according to a second user input received by the input receiver.

10. The electronic device of claim 8, wherein the processor is configured to:
increase the position offset parameter to move a calibration pattern corresponding to a pattern image in a direction corresponding to one direction, based on a straight-line manipulation of the one direction being detected in the input receiver while the pattern image corresponding to the position offset parameter is provided, and
decrease the position offset parameter to move a calibration pattern corresponding to a pattern image in a direction corresponding to the other direction, based on a straight-line manipulation of another direction opposite to the one direction being detected in the input receiver while the pattern image corresponding to the position offset parameter is provided.

11. The electronic device of claim 8, wherein the input receiver comprises a touchscreen, and
wherein the processor is further configured to:
output a graphic representation guiding a straight-line manipulation on the touchscreen during the calibration for the position offset parameter; and
adjust the position offset parameter based on a linear movement of a touch point from one point to another point on the touchscreen being detected based on the graphic representation.

12. The electronic device of claim 1, wherein the processor is further configured to perform calibration of the position offset parameter of the parallax optical element by automatically repeating an adjustment of the position offset parameter until a reference line of a calibration pattern included in a reference image captured by a camera installed in the eyebox is aligned.

13. The electronic device of claim 1, wherein the processor is further configured to track a change of the LDA based on an eye height of the user.

14. The electronic device of claim 1, wherein the processor is further configured to track a change of the LDA based on driving of a motor rotating a magnifying mirror that magnifies an image ray output from a display panel in the display device.

15. The electronic device of claim 1, wherein the processor is further configured to:
in response to the change of the LDA, adjust a position offset parameter of the parallax optical element by applying the changed LDA to a linear LDA model, while maintaining values of a pitch parameter and a slanted angle parameter of the parallax optical element.

16. The electronic device of claim 1, wherein the processor is further configured to:
precede and complete calibration of a pitch parameter and a slanted angle parameter among parameters of the parallax optical element; and
initiate the calibration of the position offset parameter based on the change of the LDA while the pitch parameter and the slanted angle parameter remain constant.

17. The electronic device of claim 1, wherein the processor is further configured to:
store parameters personalized to the user of the parallax optical element based on the calibration of the parameter of the parallax optical element being completed on the user;
render a content image based on the personalized parameters; and
output the content image to the display device.

18. The electronic device of claim 1, wherein the display device is implemented as at least a portion of a head-up display (HUD) mounted on a vehicle comprising a motorcycle, a car, a train, a watercraft, an aircraft, and a spacecraft.

19. A method comprising:
providing, by a parallax optical element, a light corresponding to an image output from a display device, to an eyebox of a user; and
adjusting a parameter of the parallax optical element based on a change of a look down angle (LDA) between the eyebox and a virtual image plane formed by the display device and the parallax optical element.

20. A non-transitory computer-readable recording medium comprising one or more computer programs comprising instructions that are executed by a computer processor to perform a method comprising:
providing, by a parallax optical element, a light corresponding to an image output from a display device to an eyebox of a user; and
adjusting a parameter of the parallax optical element based on a change of a look down angle (LDA) between the eyebox and a virtual image plane formed by the display device and the parallax optical element.

21. An electronic device comprising:
a display device;
a parallax optical element configured to provide a light corresponding to an image output from the display device to an eyebox of a user; and
a processor configured to adjust an offset parameter among parameters of the parallax optical element based on a change of a look down angle (LDA) between the eyebox and a virtual image plane formed by the display device and the parallax optical element.

* * * * *